United States Patent
Wilson et al.

(10) Patent No.: US 10,686,492 B1
(45) Date of Patent: Jun. 16, 2020

(54) AUTOMATIC CONFIGURATION UPDATING TO STABILIZE PORTS IN A TELECOMMUNICATION SYSTEM

(71) Applicant: ADTRAN, Inc., Huntsville, AL (US)

(72) Inventors: Arlynn Wayne Wilson, Huntsville, AL (US); Robert A. Barrett, Madison, AL (US); Nicholl Jamila Jones, Huntsville, AL (US)

(73) Assignee: ADTRAN, Inc., Huntsville, AL (US)

(*) Notice: Subject to any disclaimer, the term of this patent is extended or adjusted under 35 U.S.C. 154(b) by 159 days.

(21) Appl. No.: 15/951,306

(22) Filed: Apr. 12, 2018

(51) Int. Cl.
  *H04B 3/32* (2006.01)
  *H04B 3/487* (2015.01)
  *H04B 1/38* (2015.01)
  *H04L 12/70* (2013.01)

(52) U.S. Cl.
  CPC .......... *H04B 3/32* (2013.01); *H04B 1/38* (2013.01); *H04B 3/487* (2015.01); *H04L 2012/5627* (2013.01)

(58) Field of Classification Search
  CPC ... H04B 1/38; H04B 1/40; H04B 3/23; H04B 3/231; H04B 3/32; H04B 3/487; H04L 2012/5627; H04M 3/002; H04M 3/005; H04M 3/007; H04M 3/085; H04M 3/10
  USPC ........ 375/219, 220, 222; 370/282, 286, 289; 379/406.01, 406.05, 406.06, 399.01, 379/413.02, 413.03
  See application file for complete search history.

(56) References Cited

U.S. PATENT DOCUMENTS

| | | | | |
|---|---|---|---|---|
| 8,582,425 B1* | 11/2013 | Turner | ..................... | H04B 3/32 370/222 |
| 2012/0147932 A1* | 6/2012 | Wilkes | ................ | H04L 12/2892 375/219 |
| 2012/0224674 A1* | 9/2012 | Goodson | .................. | H04B 3/32 379/27.01 |
| 2012/0250492 A1* | 10/2012 | Schneider | .............. | H04Q 11/04 370/201 |
| 2013/0010585 A1* | 1/2013 | Chu | ........................ | H04B 3/32 370/201 |
| 2016/0073448 A1* | 3/2016 | Strobel | ..................... | H04B 3/32 370/281 |
| 2016/0087677 A1* | 3/2016 | Strobel | ..................... | H04B 3/32 375/285 |
| 2016/0105215 A1* | 4/2016 | Wang | ....................... | H04B 3/32 370/201 |
| 2016/0254875 A1* | 9/2016 | Gupta | ................... | H04L 5/1469 370/294 |

(Continued)

*Primary Examiner* — Young T Tse
(74) *Attorney, Agent, or Firm* — Maynard Cooper & Gale, P. C.; Joe E. Holland

(57) ABSTRACT

Multiple ports of a vectored digital subscriber line (DSL) system can be automatically reconfigured to respond to a fault or defect associated with another one of the ports of the system. Information regarding retrain events for the ports of the system can be examined to identify the "bad" port with the associated fault or defect and the corresponding group of ports affected by the bad port. The affected group of ports can be identified as a group of ports that all were retrained within a predetermined time period and for common retrain reasons (e.g., 1 or 2 different retrain reasons). Once the affected group of ports is identified, the affected group of ports and the bad port can receive corresponding repair profiles to reconfigure the ports to respond to the fault or defect.

26 Claims, 5 Drawing Sheets

(56) References Cited

U.S. PATENT DOCUMENTS

| | | | |
|---|---|---|---|
| 2017/0279489 A1* | 9/2017 | Singh | H04B 3/32 |
| 2019/0280795 A1* | 9/2019 | Kuipers | H04J 3/1694 |

* cited by examiner

AUTOMATIC CONFIGURATION UPDATING TO STABILIZE PORTS IN A TELECOMMUNICATION SYSTEM

BACKGROUND

In telecommunication systems, many subscriber lines are often bound within a single binder (e.g., cable) in order to facilitate deployment. Subscriber lines bound within the same binder are sufficiently close in proximity such that crosstalk can couple from one subscriber line to another thereby degrading signal quality. One way to address the this problem is to use a vectoring algorithm to substantially cancel crosstalk that couples between a group of subscriber lines, referred to in this context as a "vectoring group." To cancel the crosstalk from the subscriber lines, the vectoring algorithm can mathematically couple each individual subscriber line to the other subscriber lines in the vectoring group such that the crosstalk from the other subscriber lines is cancelled.

When a fault occurs in one of the subscriber lines, the corresponding port (or transceiver) for the subscriber line may be frequently retrained due to recurring performance issues resulting from the fault. To reduce retrains, remediation sequences can be implemented to identify "problem" ports and make corresponding modifications to the configuration of the port to provide for increased stability of the port (e.g., less retrains of the ports). Typical remediation techniques review the performance of individual ports to identify problem ports and then apply corresponding repair profiles to the identified problem ports. While existing remediation techniques can be effective at times to reduce retrains and thereby improve performance, improved techniques for controlling the configuration of ports to further optimize performance is generally desired.

BRIEF DESCRIPTION OF THE DRAWINGS

Wherever possible, the same reference numbers are used throughout the drawings to refer to the same or like parts.

DETAILED DESCRIPTION

Figure 1:
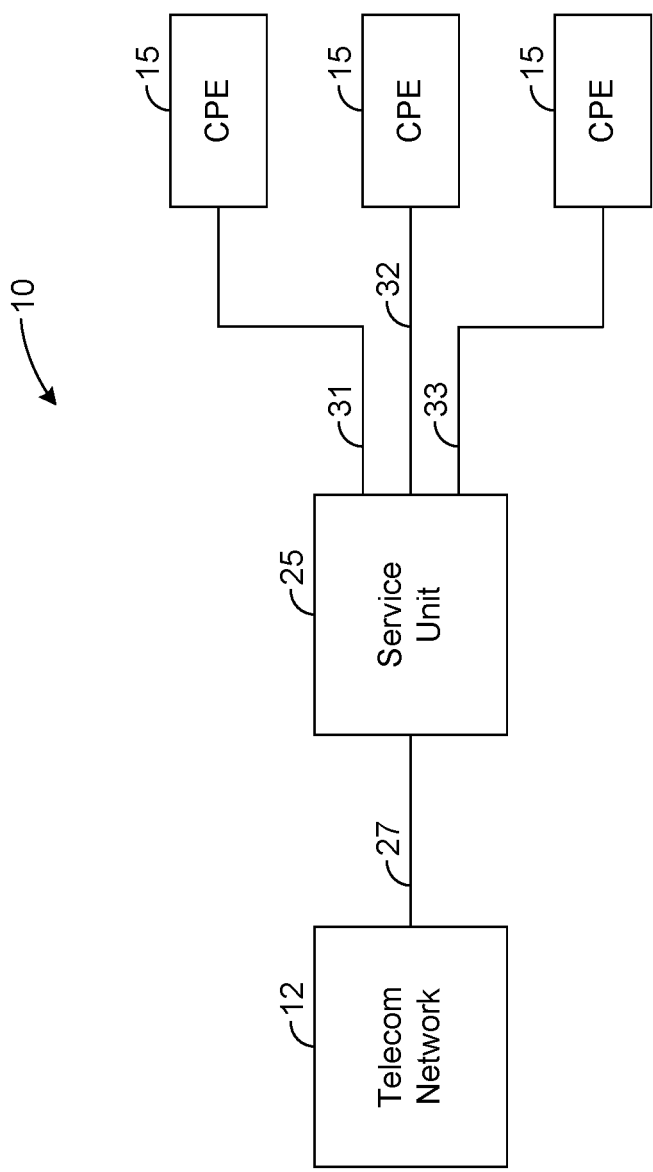
FIG. 1 is a block diagram showing an embodiment of a telecommunication system.

When vectoring operations are performed to reduce crosstalk within a vectoring group that includes a subscriber line having a fault or defect (e.g., a bad splice or poor bonding and grounding), the mathematical coupling of the subscriber lines by the vectoring algorithm can propagate the effect of the fault to some or all of the other subscriber lines in the vectoring group. In this regard, changing line impedance resulting from the fault can result in ineffective crosstalk cancellation until vectoring coefficients used by the vectoring algorithm are updated to correspond to the current line conditions. Such ineffective crosstalk cancellation can degrade the performance of all of the subscriber lines in the vectoring group possibly resulting in retrains for ports that are not coupled to the defective subscriber line. Since typical remediation techniques look at individual port performance (i.e., each port has to be individually identified and repaired), the remediation of all of the affected ports in a vectoring group can result in inefficient configuration changes to ports that are not coupled to defective subscriber lines. In some embodiments of the present disclosure, a vectored communication system is designed to recognize when performance issues for one or more ports, referred to as "non-defective ports" in this context, are caused by faults or defects associated with one or more ports, referred to "defective ports" in this context, such as a port that is coupled to a subscriber line having a fault or defect (e.g., a degraded splice). Based on this recognition, the system may change the configurations of non-defective ports in a different manner relative to defective ports in order to achieve improved communication performance across all of the ports.

As an example, in a vectored DSL system in accordance with one embodiment of the present disclosure, retrain information such as the time and reason for a retrain event is reviewed for each port of a vectoring group. The corresponding times (or timestamps) of the retrain events can be reviewed to determine the ports that have had retrain events within a predetermined time period of one another. For example, all the ports having a retrain event occurring within 1 minute (or some other time period) of each other can be identified as a group. Next, the number of ports having retrain events within the predetermined time period can be compared to a preselected value to determine if a multiport retrain event occurred. In general, as used herein, a "multiport retrain event" generally refers to a group of port retrains likely triggered by the same event, such as an impedance fluctuation on a subscriber line within the vectoring group.

Additional factors may also be considered when determining if a multiport retrain event has occurred. The reason for a retrain event can also be reviewed and used to determine if a multiport retrain event has occurred. In some embodiments, a multiport retrain event can be determined to have occurred if the number of ports having retrain events within the predetermined time period is greater than a preselected value and the ports having retrain events share common reasons for the retrain events. For example, the ports of a multiport retrain event may share a small number of common reasons (e.g., 1 or 2) for the occurrence of the retrain event.

If a multiport retrain event has occurred, the root cause port (for the multiport retrain event) can then be identified. In general, as used herein, a "root cause port" refers to a port that is associated with a communication problem (e.g., a line fault) that likely triggers a multiport retrain event. The root cause port can be a port having a corresponding subscriber line with a fault or defect, such as a bad splice, that causes frequent fluctuations in the corresponding impedance of that port. When the impedance of the root cause port changes, the corresponding vectoring coefficients for the other ports of the vectoring group may no longer be effective to cancel crosstalk thereby causing the other ports to experience degraded signal quality requiring the ports to be retrained. In fact, if the vectoring coefficients are no longer accurate due to an impedance change in at least one subscriber line of the vectoring group, it is possible for the vectoring operations to actually inject more noise into the system than what is removed. This situation can occur until the vectoring coefficients are updated to accurately reflect the current conditions on the subscriber lines. In some embodiments, the root cause port can be identified as a port having a retrain event prior to the multiport retrain event and having a retrain reason associated with a fault or defect in the subscriber line. Once the root cause port is identified, the victim ports affected by the root cause port can be identified. The victim ports can correspond to the ports of the multiport retrain event or can correspond to ports with vectoring coefficients associated with the root cause port. After the root cause port and the victim ports are identified, repair profiles can be provided to each of the ports to reconfigure the ports for better stability. The repair profile applied to each port can reconfigure parameters associated with the impulse noise protection (INP), margins or data rate associated with the port.

In another embodiment, the present application is directed to a method to stabilize multiport retrain events in vectored (noise cancellation) DSL systems. The method can stabilize not only the bad (chronic) port but also victim ports caused by vectoring algorithmic coupling resulting in system instability. The method can use retrain reason and event time correlation to direct repair profile automation to the network element with the ports and to direct field loop diagnostics.

FIG. 1 depicts an exemplary embodiment of a telecommunication system 10. As shown by FIG. 1, the system 10 comprises a telecommunication network 12 configured to communicate with customer premises equipment (CPE) 15, which may include one or more customer premises (CP) transceivers (not shown in FIG. 1). The network 12 can include any of various types of telecommunication networks, such as the public switched telephone network (PSTN), local area networks (LANs), wide area networks (WANs), cellular networks, the Internet, or other types of networks known to carry telecommunication signals. The network 12 may be coupled to a service unit (SU) 25 located at a distribution point or other intermediate point between the network 12 and the CPEs 15. The service unit 25 may be coupled to the network 12 via a network line 27 and to the CPEs 15 via a plurality of subscriber lines 31-33, such as twisted-wire pairs. In some embodiments, the network line 27 comprises an optical fiber, but other types of network lines, such as one or more twisted-wire pairs, may be used in other embodiments. For simplicity of illustration, FIG. 1 depicts three CPEs 15 and three subscriber lines 31-33, but there can be any number of CPEs and any number of subscriber lines 31-33 in other embodiments.

In a downstream direction, the service unit 25 receives a high-speed data stream from the network 12 via the network line 27 and forwards packets from the high-speed data stream across the plurality of subscriber lines 31-33. In an upstream direction, the service unit 25 receives data streams from the CPEs 15 via the subscriber lines 31-33 and transmits packets from such data streams across the network line 27 to the network 12.

In some embodiments, each subscriber line 31-33 includes at least one twisted-wire pair, and digital subscriber line (DSL) modulation formats are used to communicate data across the subscriber lines 31-33. In an embodiment, DSL protocols such as asymmetric DSL (ADSL), very-high-bit-rate DSL (VDSL), G.fast, high-bit-rate DSL (HDSL), VDSL2 or other known protocols can be used to communicate data across the subscriber lines 31-33. In an embodiment, the data can be communicated across the subscriber lines 31-33 using discrete multi-tone (DMT) modulation in accordance with the corresponding DSL protocol being used. DMT modulation uses a sequence of equally spaced frequencies or tones, each of which is modulated using quadrature amplitude modulation (QAM), to encode multiple carrier signals at different frequencies with digital data. However, other modulation formats may be used in other embodiments.

Figure 2:
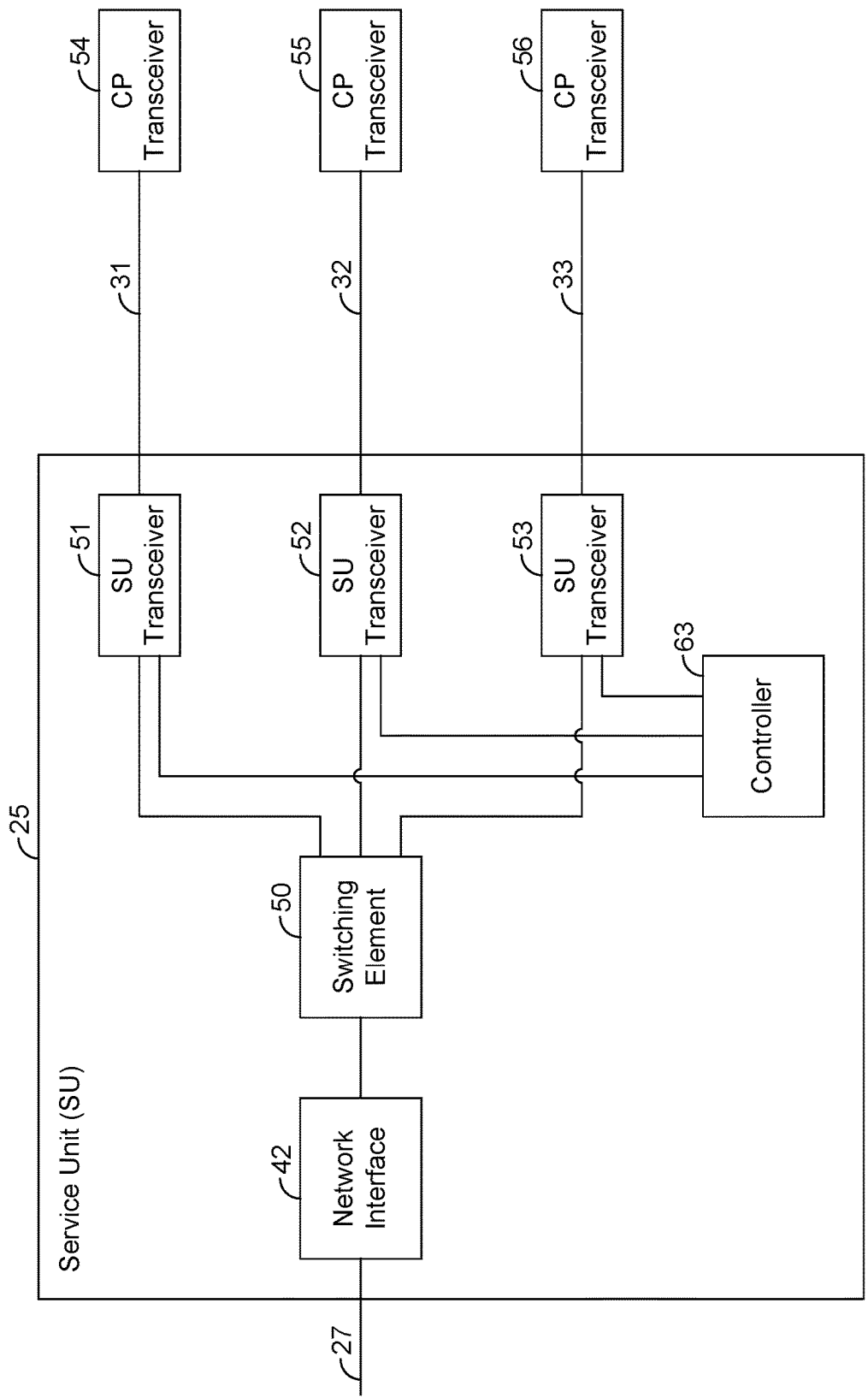
FIG. 2 is a block diagram showing an embodiment of a service unit from the telecommunication system of FIG. 1.

FIG. 2 depicts an exemplary embodiment of the service unit (SU) 25. As shown by FIG. 2, the service unit 25 includes a network interface 42 that is coupled to the network line 27 and a plurality of transceivers 51-53 that are respectively coupled to the subscriber lines 31-33. In an embodiment, the service unit 25 can be a DSL Access Multiplexer (DSLAM). In the exemplary embodiment shown by FIG. 2, the SU transceiver 51 is coupled to a CP transceiver 54 by the subscriber line 31, the SU transceiver 52 is coupled to a CP transceiver 55 by the subscriber line 32, and the SU transceiver 53 is coupled to a CP transceiver 56 by the subscriber line 33.

As shown by FIG. 2, a switching element 50 is coupled between the network interface 42 and the SU transceivers 51-53. The switching element 50 may be implemented in hardware or a combination of hardware and software. In one exemplary embodiment, the switching element 50 is implemented as a field-programmable gate array, but other types of switching elements 50 are possible in other embodiments.

In the downstream direction, the network interface 42 receives data packets from the network line 27 and transmits such data packets to the switching element 50, which is configured to forward the data packets to the SU transceivers 51-53 for transmission across the subscriber lines 31-33 based on header information within the data packets using forwarding techniques known in the art. When an SU transceiver 51-53 receives data packets from the switching element 50, the SU transceiver modulates a carrier signal with the data packets to form a data signal that is transmitted across the transceiver's respective subscriber line 31-33.

In the upstream direction, the SU transceivers 51-53 receive modulated data signals from the subscriber lines 31-33. For a given signal received by a given SU transceiver 51-53, the SU transceiver demodulates the received signal to recover data packets. The SU transceiver forwards the data packets to the switching element 50, and the switching element 50 combines the data packets received from all of the SU transceivers 51-53 into a high-speed data stream, which is received by the network transceiver 42 for transmission across the network line 27.

As shown by FIG. 2, each SU transceiver 51-53 is coupled to at least one controller 63 that is configured to perform various functions, as will be described in more detail below. The controller 63 may be implemented as a combination of hardware and software, such as at least one microprocessor or other type of processor programmed with instructions for performing various functions. Other configurations of the controller 63 are possible in other embodiments. As an example, the controller 63 may be implemented as a field programmable gate array (FPGA) or other type hardware as may be desired.

Figure 3:
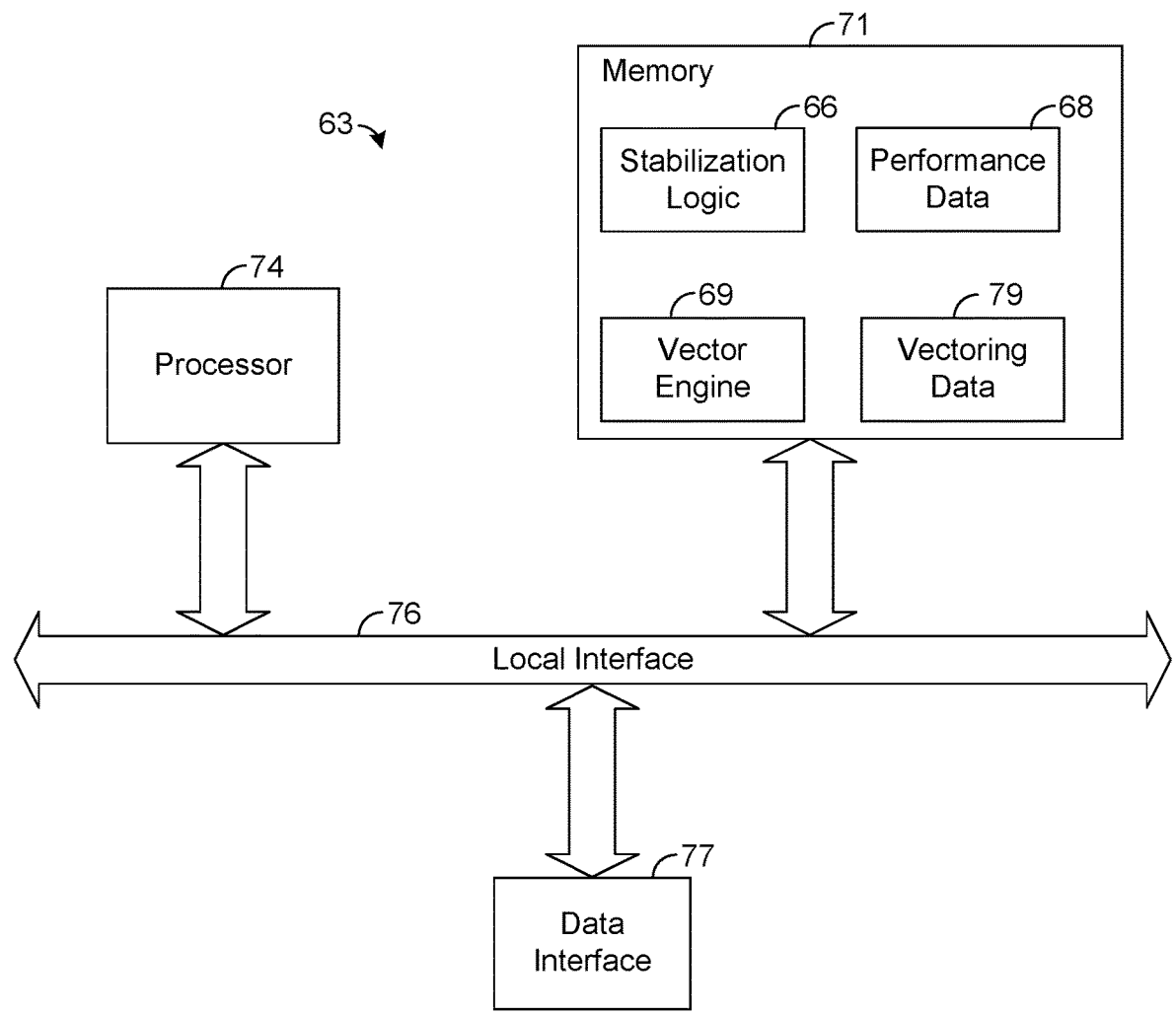
FIG. 3 is a block diagram showing an embodiment of a controller from the service unit of FIG. 2.

FIG. 3 depicts an exemplary embodiment of the controller 63. As shown by FIG. 3, the controller 63 may include stabilization logic 66 to identify multiport retrain events that affect the performance of several SU transceivers 51-53 based on information stored in performance data 68 and to adjust the configurations of the SU transceivers 51-53 in response to the occurrence of a multiport retrain event at the SU transceivers 51-53. The controller 63 may also include a vector engine 69 for performing crosstalk vectoring in order to cancel far-end crosstalk (FEXT) that couples from one subscriber line 31-33 to another. The stabilization logic 66 and the vector engine 69 can be implemented in software, hardware, firmware or any combination thereof. In the exemplary controller 63 illustrated by FIG. 3, the stabilization logic 66 and the vector engine 69 are implemented in software and stored in memory 71 of the controller 63.

The exemplary controller 63 depicted by FIG. 3 includes at least one conventional processor 74, such as a digital signal processor (DSP) or a central processing unit (CPU), that communicates to and drives the other elements within the controller 63 via a local interface 76, which can include at least one bus. Furthermore, a data interface 77 permits the controller 63 to receive data from or communicate data to other components of the service unit 25 (e.g., SU transceivers 51-53) as may be desired.

In the embodiment shown by FIG. 2, the controller 63 is shown as part of the service unit 25 and may be at the same location as other components of the service unit 25, such as the SU transceivers 51-53, for example. However, at least portions of the controller 63 may be dispersed geographically and/or reside at other locations relative to other components of the service unit 25. As an example, the stabilization logic 66 and the performance data 68 may be located in the network 12 external to the service unit 25 (e.g., respectively run on and stored in a server of the network 12) and communicate with components of the service unit 25 using the network line 27 or another channel, such as a cellular network, for example. As an example, the retrain events may be reported to the stabilization logic 66 through the network 12, and the stabilization logic 66 may then analyze the retrain events and control the port settings remotely using techniques similar to those described herein for FIG. 2.

As indicated above, the vector engine 69 depicted by FIG. 3 is configured to cancel FEXT that couples from one subscriber line 31-33 to another. In some embodiments, the vector engine 69 generates and maintains vectoring data 79, which is stored in memory 71, for use in performing crosstalk vectoring. When DMT signals are used, the vectoring data 79 may include vectoring coefficients for the tones transmitted and received by the SU transceivers 51-53. Via known techniques, the vector engine 69 may use such vectoring data 79 to estimate crosstalk that affects the received tones or that will affect tones to be transmitted so that such crosstalk can be cancelled.

For example, the vectoring data 79 may include sets of vectoring coefficients respectively corresponding to the tones communicated across the subscriber lines 31-33. For a given tone, referred to in this example as "victim tone," received by one of the SU transceivers 51-53 from one of the subscriber lines 31-33, the corresponding set of vectoring coefficients includes vectoring coefficients respectively associated with the tones, referred to as "interfering tones," that interfere with the victim tone. Upon receiving symbols communicated across the subscriber lines 31-33, the transceivers 51-53 send such symbols to the controller 63. The vector engine 69 combines (e.g., multiplies) the symbol of an interfering tone with the vectoring coefficient associated with such interfering tone and then combines (e.g., subtracts) this result with a victim tone in order to cancel the crosstalk interference from the interfering tone affecting the victim tone. The vector engine 69 performs the same process for the other interfering tones in order to cancel, tone-by-tone, crosstalk interference in the victim tone.

The vector engine 69 may use the same techniques to cancel crosstalk from any victim tone received from any subscriber line 31-33 within the same vectoring group. As known in art, a "vectoring group" generally refers to a group of subscriber lines for which a vector engine maintains vectoring coefficients so that crosstalk from interfering tones communicated by the vectoring group can be cancelled. For illustrative purposes, assume that each of the subscriber lines 31-33 are within the same vectoring group so that the vector engine 69 is capable of cancelling crosstalk that couples from any of the subscriber lines 31-33 to any of the other subscriber lines 31-33.

Note that the vector engine 69 may use techniques similar to those described above in order to precode the symbols transmitted by the SU transceivers 51-53 across the subscriber lines 31-33 such that crosstalk is cancelled as the symbols propagate across the subscriber lines 31-33. Exemplary techniques for performing crosstalk vectoring, including symbol precoding, are described in commonly-assigned U.S. Pat. No. 8,582,425, entitled "Systems and Methods for Cancelling Crosstalk in Satellite Access Devices" and granted on Nov. 12, 2013, which is incorporated herein by reference.

Figure 4:
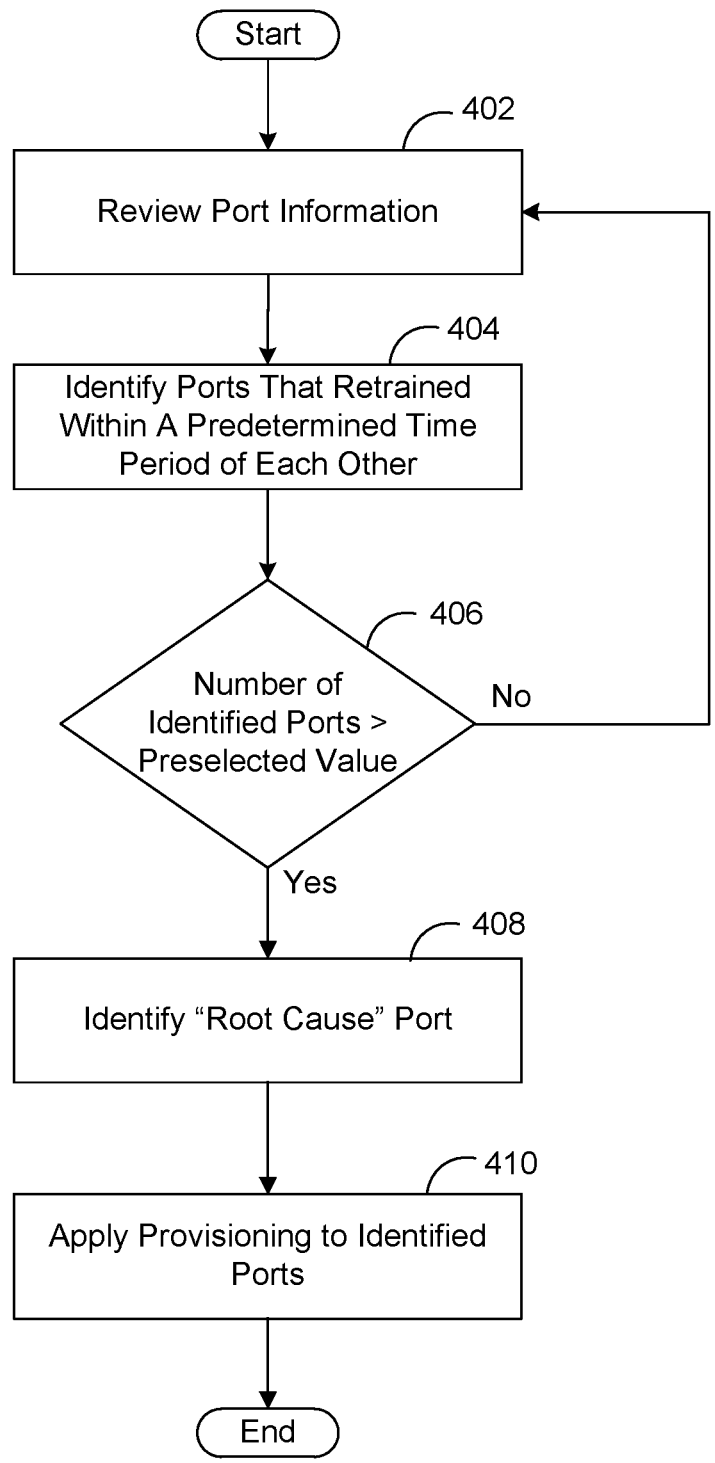
FIG. 4 is a flowchart showing an embodiment of a process for stabilizing multiple ports in a vectored DSL (digital subscriber line) system.

FIG. 4 is a flowchart showing an embodiment of a process for stabilizing multiple ports in a vectored DSL system. The process begins by reviewing the port information for the transceivers associated with a vectoring group (step 402). In an embodiment, the performance data 68 can store performance metrics, such as retrain events, for each SU transceiver 51-53 and corresponding port. Each time a SU transceiver 51-53 is retrained (or reinitialized) as a result of an error, signal margin fluctuation, or other similar triggering event, the performance data 68 associated with that SU transceiver 51-53 (and corresponding port) can be updated by the transceiver to indicate that the transceiver has been retrained and to indicate the time and the reason the transceiver was retrained (if such information is provided by the transceiver).

In one embodiment, the performance data 68 may also store other information on the SU transceivers 51-53 in addition to the information regarding the retraining of the SU transceivers 51-53. For example, the performance data 68 can include information on the number of bits sent and received by the SU transceivers 51-53, the number of seconds the SU transceivers 51-53 were unavailable, the number of erred seconds for the SU transceivers 51-53 and the number of severely erred seconds for the SU transceivers 51-53. In an embodiment, the information can be obtained from the SU transceivers 51-53 at a predetermined time interval (e.g., every 15 minutes) and stored in performance data 68.

In one embodiment, the processor 74 can obtain and review the performance data 68 for the SU transceivers 51-53 of the service unit 25 to identify the corresponding ports of the SU transceivers 51-53 with retrain events. The identified retrain events, with the corresponding reasons for (or error messages associated with) the retrain events, if available, can then be placed in chronological order by the processor 74. For example, Table 1 shows a listing of ports experiencing retrain events with the corresponding time and reason for the retrain event.

It should be noted that the retrain reasons described herein are exemplary, and other retrain reasons are possible. In this regard, when a retrain occurs, the SU transceiver involved in the retrain is typically designed to evaluate or diagnose a problem or condition that caused the retrain and provide a notification indicating the time of the retrain, as well as the reason for the retrain. Such statement may be vendor-specific (e.g., a code used by the vendor of a transceiver to identify the retrain reason). Exemplary retrain reasons are shown by FIG. 1, but other types of statements may be used to indicate the same or other retrain reasons in other examples. The controller 63 may be configured to receive such notifications from the SU transceivers 51-53 and include the information from such notifications in the performance data 68.

TABLE 1

| Entry | Port | Time | Reason |
|---|---|---|---|
| 1 | 3/23 | 20:00:04 | Lost Customer |
| 2 | 3/14 | 20:00:50 | Increased Noise Upstream |
| 3 | 2/1 | 20:01:19 | Upstream Bitswap Error |
| 4 | 2/2 | 20:01:19 | Increased Noise Upstream |
| 5 | 2/3 | 20:01:19 | Increased Noise Upstream |
| 6 | 2/47 | 20:01:19 | Upstream Bitswap Error |
| 7 | 2/16 | 20:01:20 | Increased Noise Upstream |
| 8 | 2/22 | 20:01:20 | Increased Noise Upstream |
| 9 | 2/41 | 20:01:20 | Increased Noise Upstream |
| 10 | 2/12 | 20:01:22 | Upstream Bitswap Error |
| 11 | 2/44 | 20:01:22 | Upstream Bitswap Error |
| 12 | 2/36 | 20:01:23 | Increased Noise Upstream |
| 13 | 2/6 | 20:01:26 | Increased Noise Upstream |
| 14 | 2/33 | 20:01:26 | Upstream Bitswap Error |
| 15 | 1/2 | 20:01:28 | Increased Noise Upstream |
| 16 | 1/5 | 20:01:28 | Increased Noise Upstream |
| 17 | 1/8 | 20:01:29 | Increased Noise Upstream |
| 18 | 1/27 | 20:01:40 | Increased Noise Upstream |
| 19 | 1/44 | 20:01:41 | Increased Noise Upstream |
| 20 | 4/31 | 20:01:48 | Upstream Bitswap Error |

After the retrain events are sorted chronologically, the corresponding ports that have experienced retrain events within a predetermined time period of each other are identified (step 404). In one embodiment, the predetermined time period can be between 30 seconds and 1 minute. However, in other embodiments, the predetermined time period can be less than 30 seconds or greater than 1 minute. For example, referring to Table 1, if the predetermined time period is 30 seconds, then the ports associated with entries 2-9 can be included in the identified group. In contrast, if the predetermined time period is 1 minute, then the ports associated with entries 2-20 can be included in the identified group.

In another embodiment, the identified ports with retrain events within the predetermined time period can be further grouped by the corresponding reason(s) for the retrain event. In other words, the group of identified ports with a retrain event within the predetermined time period can be limited to those ports that had one or more specific reasons for the retrain event. In an embodiment, the one or more specific reasons for the retrain event can be limited to two or less specific reasons for the retrain event. However, in other embodiments, more than two specific reasons can be used to filter the group of identified ports with a retrain event within the predetermined time period. For example, referring to Table 1, the identified group of ports can include ports having retrain reasons of "Increased Noise Upstream" or "Upstream Bitswap Error," which would correspond to the ports associated with entries 2-20, if the predetermined time period was 1 minute. In contrast, if the identified group of ports can only include ports having retrain reasons of Increased Noise Upstream, then the ports associated with entries 3, 6, 10, 11, 14 and 20, which have a retrain reason of Upstream Bitswap Error, may be excluded from the identified group of ports, if the predetermined time period was 1 minute.

In one embodiment, retrain reasons that correspond to different directions of communication (e.g., upstream and downstream) would not be considered the same retrain reason even if the remainder of the reason for the retrain event was the same. For example, a retrain reason of Increased Noise Upstream would not be considered the same reason as a retrain reason of Increased Noise Downstream since one retrain reason is associated with the upstream direction and the other retrain reason is associated with the downstream direction.

The number of identified ports that were retrained within the predetermined time period can then compared to a preselected value (step 406) to determine if a multiport retrain event has occurred. A multiport retrain event can correspond to a group of ports having to be retrained within a short time period as a result of a triggering event occurring at another port. Alternatively, the multiport retrain event can correspond to a group of ports being retrained within a short time period and for similar reasons. If the number of identified ports that were retrained within the predetermined time period is less than (or equal to) the preselected value, a determination is made that no multiport retrain event has occurred and the process returns to step 402 to review port information again. However, if the number of identified ports that were retrained within the predetermined time period is greater than the preselected value, a determination is made that a multiport retrain event has occurred and the process proceeds to identify the "root cause" port (step 408) of the multiport retrain event.

The root cause port can correspond to the port of the service unit 25 that has an associated fault or defect that causes the multiport retrain event to occur. In other words, the root cause port can be considered a "bad" or chronic port that affects other ports. The multiport retrain event may occur because vectoring coefficients learned by the vector engine 69 and stored in the vectoring data 79 for each of the subscriber lines 31-33 are at least slightly affected by the relative line impedances of the subscriber lines 31-33 in the same vectoring group. Thus, any change in line impedance of one subscriber line relative to the line impedance of another subscriber line, such as impedance fluctuations from a fault (e.g., a degraded splice or a line cut) on a subscriber line, may degrade vectoring performance in the other subscriber lines to the point that the corresponding ports have to be retrained thereby generating the multiport retrain event.

The fault or defect associated with the root cause port can result in the retraining of the root cause port. The time and reason (if available) for the retraining of the root cause port can be stored in performance data 68. The occurrence of a fault or defect in a subscriber line can result in a specific retrain reason being provided as the reason for the retrain event in the root cause port. The specific reason provided for the retrain event can be associated with the loss of a connection between the SU transceiver and the CP transceiver. In one embodiment, the specific reason for a retrain event as a result of a loss of a connection between the SU transceiver and the CP transceiver can be identified as "Lost Customer."

In one embodiment, a port can be identified as the root cause port if the port is retrained prior to the occurrence of the multiport retrain event and the reason for the retrain event is associated with a possible presence of a fault or defect in the subscriber line. For example, a retrain reason of Lost Customer for a port prior to a multiport retrain event can indicate the presence of a fault or defect in the corresponding subscriber line for that port since a line fault affects the impedance of that subscriber line and the corresponding vectoring coefficients based on the impedance. The root cause port can be identified as a port having a retrain event a predetermined time period prior to the multiport retrain event. In one embodiment, the predetermined time period can be between 30 seconds and 1 minute. However, in other embodiments, the predetermined time period can be less than 30 seconds or greater than 1 minute. For example, referring to Table 1, if the predetermined time period is 1 minute and a multiport retrain event is determined to correspond to the ports associated with entries 2-20, the root cause port can be the port corresponding to entry 1 since the port had a retrain event within the predetermined time period and for the appropriate reason (i.e., Lost Customer).

In another embodiment, when the group of identified ports is based on the ports with retrain events within the predetermined time period, the group of identified ports can be further grouped by the corresponding crosstalk or vectoring coefficients (e.g., HLIN or H LOG) associated with the root cause port. The crosstalk coupling matrix can be reviewed to identify coefficients (based on the root cause port) having high values. The corresponding ports with the high value crosstalk or vectoring coefficients can then be included in the group of identified ports. In an embodiment, the group of identified ports can correspond to a set of victim ports associated with the root cause port.

Once the root cause port and the ports associated with the multiport retrain event (or victim ports) are identified, the appropriate provisioning and/or repair profiles can be applied to the identified ports (step 410). In one embodiment, a more robust provisioning or repair profile can be applied to the root cause port, while the identified ports of the multiport retrain event receive a less robust provisioning or repair profile than the root cause port. In other words, the provisioning or repair profile for the root cause port can be different from the repair or provisioning profile for the victim ports. In another embodiment, the provisioning or repair profile for each of the victim ports can be different, but can be the same in other embodiments. The provisioning or repair profile can adjust different parameters associated with the port to reconfigure the corresponding port.

In one embodiment, the provisioning or repair profile can adjust one or more of the method of INP (impulse noise protection), the level of INP, the transmission margins, the net data rates and/or the enabling of seamless rate adaptation. In an embodiment, the methods of INP can include the use of error-correcting codes such as Reed-Solomon codes or the retransmission of data. In an embodiment, the level of INP can be adjusted by configuring parameters such as minINP (the minimum number of consecutive symbols that can be corrected) and/or delay (the maximum time for interleave delay) to increase (or decrease) the level of INP. In an embodiment, the transmission margins can be adjusted by increasing (or decreasing) the target margin, the minimum margin, the upshift margin and/or the downshift margin.

In an embodiment, the process of FIG. 4 can be an iterative process that is automatically performed by the processor 74 and/or the stabilization logic 66. Since the process of FIG. 4 is iterative, the applying of the provisioning or repair profile may include altering different parameters depending on the iteration index. For example, on the first iteration, the mode of impulse noise protection may be changed. The level of INP can then be increased for the next several iterations. The margins can be increased on the following iteration, with decreasing the net data rate occurring on a subsequent iteration.

Figure 5:
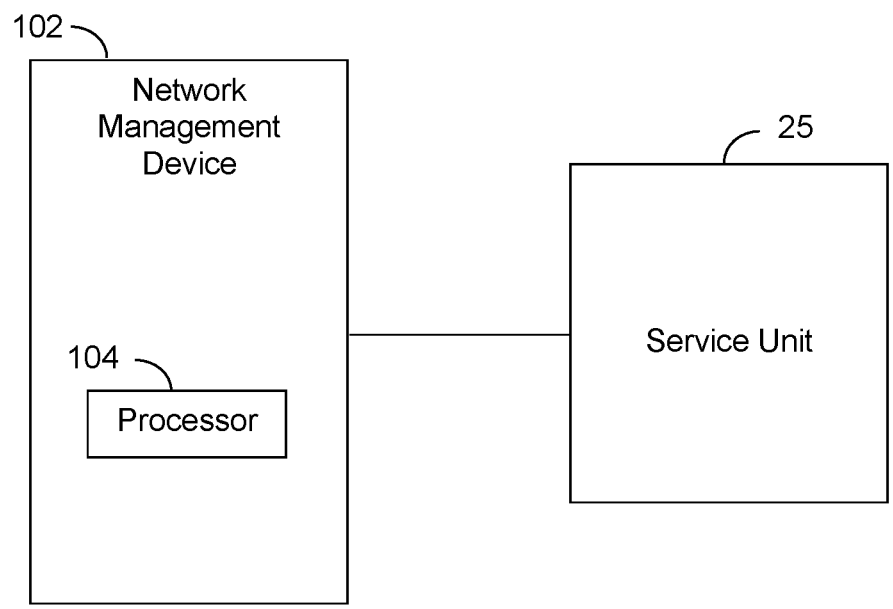
FIG. 5 is a block diagram showing an embodiment of a service unit coupled to a network management device.

In another embodiment, as shown in FIG. 5, a network management device 102 (or management entity) that is connected to the service unit 25 (e.g., a management element at a network facility) can have a processor 104 and can retrieve the performance data 68 from the service unit 25 and analyze the performance data 68 to identify a root cause port and the corresponding ports of a multiport retrain event. If the network management device 102 identifies a root cause port and the corresponding ports of a multiport retrain event, the network management device 102 can provide the appropriate provisioning and/or repair profiles to the identified ports of the service unit 25. In another embodiment, an artificial intelligence agent can be used to analyze the performance data 68 to identify a root cause port and the corresponding ports of a multiport retrain event and provide the appropriate provisioning and/or repair profiles to the identified ports.

It should be noted that the controller 63 may be configured to report faults detected in performance of the processes described above. As an example, the controller 63 may detect a line fault, such as a degraded splice, and send a message to a network administrator or other user so that the defective subscriber line may be repaired. In an embodiment described above, information from an SU transceiver may be used to detect a line fault. As an example, a transceiver may report the reason for a retrain to be loss of a connection to the CPE (e.g., Lost Customer). Ordinarily, such an event could be caused by any of various problems and is not necessarily indicative of a line fault. However, when the controller 63 determines that the transceiver reporting the connection loss is associated with a root cause port for a multiport retrain, then it is likely that the connection loss resulted from a line fault that would affect line impedance and, hence, propagate signal degradation across multiple ports of a vectoring group. In such a situation, the controller 63 may determine that a fault exists along the subscriber line coupled to the root cause port and report the fault so that it may be repaired.

One embodiment of the present application is directed to a method of stabilizing ports of a service unit in a telecommunication system, comprising: generating, by a plurality of ports of the service unit, information relating to retrain events occurring at the plurality of ports, each port of the plurality ports having a transceiver, each transceiver configured to communicate across a subscriber line in accordance with a digital subscriber line format; performing vectoring to cancel crosstalk affecting signals communicated by the plurality of ports; storing the information relating to retrain events for each port of the plurality of ports in memory; identifying, by at least one processor, a first port of the plurality of ports based on the stored information relating to retrain events, the first port having a retrain event stored in memory associated with a fault in a subscriber line; identifying, by the at least one processor, a plurality of second ports of the plurality of ports based on the stored information relating to retrain events, the plurality of second ports having corresponding retrain events stored in memory that correspond in time; and applying, by the at least one processor, a first repair profile to the first port to stabilize the first port and at least one second repair profile to the plurality of second ports to stabilize the plurality of second ports. In a further embodiment of the method, the at least one processor is located at one of a service unit or a network management device.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method of stabilizing ports in a telecommunication system, comprising:
   communicating digital subscriber line (DSL) signals with a plurality of ports of a service unit, each of the plurality of ports having a respective DSL transceiver coupled to a respective subscriber line;
   performing vectoring at the service unit to cancel crosstalk affecting the DSL signals;
   tracking retrain events occurring at the plurality of ports;
   storing, in a memory, information relating to the retrain events based on the tracking, the information indicating a time and reason for each of the retrain events;
   based on the information, identifying, by at least one processor, a plurality of the retrain events that are correlated in time;
   based on the information, identifying, by the at least one processor, a first port of the plurality of ports associated with a communication problem triggering the plurality of the correlated retrain events;
   selecting repair profiles, by the at least one processor, to apply to the plurality of ports based on the identifying the plurality of the correlated retrain events and the identifying the first port; and
   applying the selected repair profiles to the plurality of ports.

2. The method of claim 1, further comprising determining that the first port is coupled to a subscriber line having a fault based on the information.

3. A telecommunication system having a service unit communicatively coupled between a network and a plurality of customer premises, comprising:
   a plurality of ports at the service unit, each port of the plurality ports having a transceiver coupled to a respective one of a plurality of subscriber lines, each transceiver of the plurality of ports configured to communicate in accordance with a digital subscriber line format, wherein the service unit is configured to perform vectoring to cancel crosstalk between the plurality of subscriber lines;
   a memory configured to store information relating to retrain events for each port of the plurality of ports; and
   at least one processor configured to identify a first port of the plurality of ports based on the stored information relating to the retrain events and to identify a plurality of second ports of the plurality of ports based on the stored information relating to the retrain events, the first port having a retrain event stored in the memory associated with a fault in a subscriber line, the plurality of second ports having corresponding retrain events stored in the memory that correspond in time, the at least one processor further configured to apply a first repair profile to the first port to reconfigure the first port and to apply at least one second repair profile to the plurality of second ports to reconfigure the plurality of second ports.

4. The system of claim 3, wherein the first repair profile and the at least one second repair profile each include at least one of a modification of an impulse noise protection level, a modification of a margin used for communication or a modification of a data rate used for communication.

5. The system of claim 3, wherein the at least one processor is configured to automatically identify the first port and the plurality of second ports and automatically apply the first repair profile and the at least one second repair profile.

6. The system of claim 3, wherein the first repair profile is different from the at least one second profile.

7. The system of claim 3, wherein the stored information relating to the retrain events includes a time of the retrain event.

8. The system of claim 7, wherein the at least one processor is configured to identify the plurality of second ports based on the stored times of the retrain events for the plurality of second ports being within a predetermined time period.

9. The system of claim 8, wherein the predetermined time period is between 30 seconds and 1 minute.

10. The system of claim 7, wherein the at least one processor is configured to identify the plurality of second ports based on the stored times of the retrain events for the plurality of second ports being within a predetermined time period and a corresponding vectoring coefficient for each second port of the plurality of second ports being associated with the first port.

11. The system of claim 7, wherein the stored information relating to the retrain events includes a reason for the retrain event.

12. The system of claim 11, wherein the at least one processor is configured to identify the plurality of second ports based on the stored times of the retrain events for the plurality of second ports being within a predetermined time period and the reason for the retrain event being at least one predetermined reason.

13. The system of claim 3, wherein the at least one second repair profile includes a plurality of second profiles and each second profile of the plurality of second profiles is associated with a second port of the plurality of second ports.

14. A method of stabilizing ports of a service unit in a telecommunication system, comprising:
   generating, by a plurality of ports of the service unit, information relating to retrain events occurring at the plurality of ports, each port of the plurality ports having a transceiver, each transceiver configured to communicate across a subscriber line in accordance with a digital subscriber line format;
   performing vectoring to cancel crosstalk affecting signals communicated by the plurality of ports;
   storing the information relating to the retrain events for each port of the plurality of ports in a memory;
   identifying, by at least one processor, a first port of the plurality of ports based on the stored information relating to the retrain events, the first port having a retrain event stored in the memory associated with a fault in a subscriber line;
   identifying, by the at least one processor, a plurality of second ports of the plurality of ports based on the stored information relating to the retrain events, the plurality of second ports having corresponding retrain events stored in the memory that correspond in time; and
   applying, by the at least one processor, a first repair profile to the first port to stabilize the first port and at least one second repair profile to the plurality of second ports to stabilize the plurality of second ports.

15. The method of claim 14, wherein the applying the first repair profile and the at least one second repair profile includes at least one of adjusting an impulse noise protection level, adjusting a margin used for communication or adjusting a data rate used for communication.

16. The method of claim 14, wherein the identifying the first port, the identifying the plurality of second ports, and the applying the first repair profile and the at least one second repair profile are performed automatically by the at least one processor.

17. The method of claim 14, wherein the first repair profile is different from the at least one second profile.

18. The method of claim 14, wherein the storing the information relating to the retrain events includes storing a time of the retrain event.

19. The method of claim 18, wherein the identifying the plurality of second ports includes identifying the plurality of second ports based on the stored times of the retrain events for the plurality of second ports being within a predetermined time period.

20. The method of claim 19, wherein the predetermined time period is between 30 seconds and 1 minute.

21. The method of claim 18, wherein the identifying the plurality of second ports includes identifying the plurality of second ports based on the stored times of the retrain events for the plurality of second ports being within a predetermined time period and a corresponding vectoring coefficient for each second port of the plurality of second ports associated with the first port.

22. The method of claim 18, wherein the storing the information relating to the retrain events includes storing a reason for the retrain event.

23. The method of claim 22, wherein the identifying the plurality of second ports includes identifying the plurality of second ports based on the stored times of the retrain events for the plurality of second ports being within a predetermined time period and the reason for the retrain event being at least one predetermined reason.

24. The method of claim 14, wherein the identifying the first port occurs subsequent to the identifying the plurality of second ports.

25. The method of claim 24, wherein the identifying the first port includes determining whether the first port had a retrain event a predetermined time period before the retrain events for the plurality of second ports.

26. The method of claim 14, wherein the at least one processor is located at the service unit.

* * * * *